July 15, 1952     H. W. STEWARD     2,602,954
GATE HINGE
Filed Aug. 18, 1947
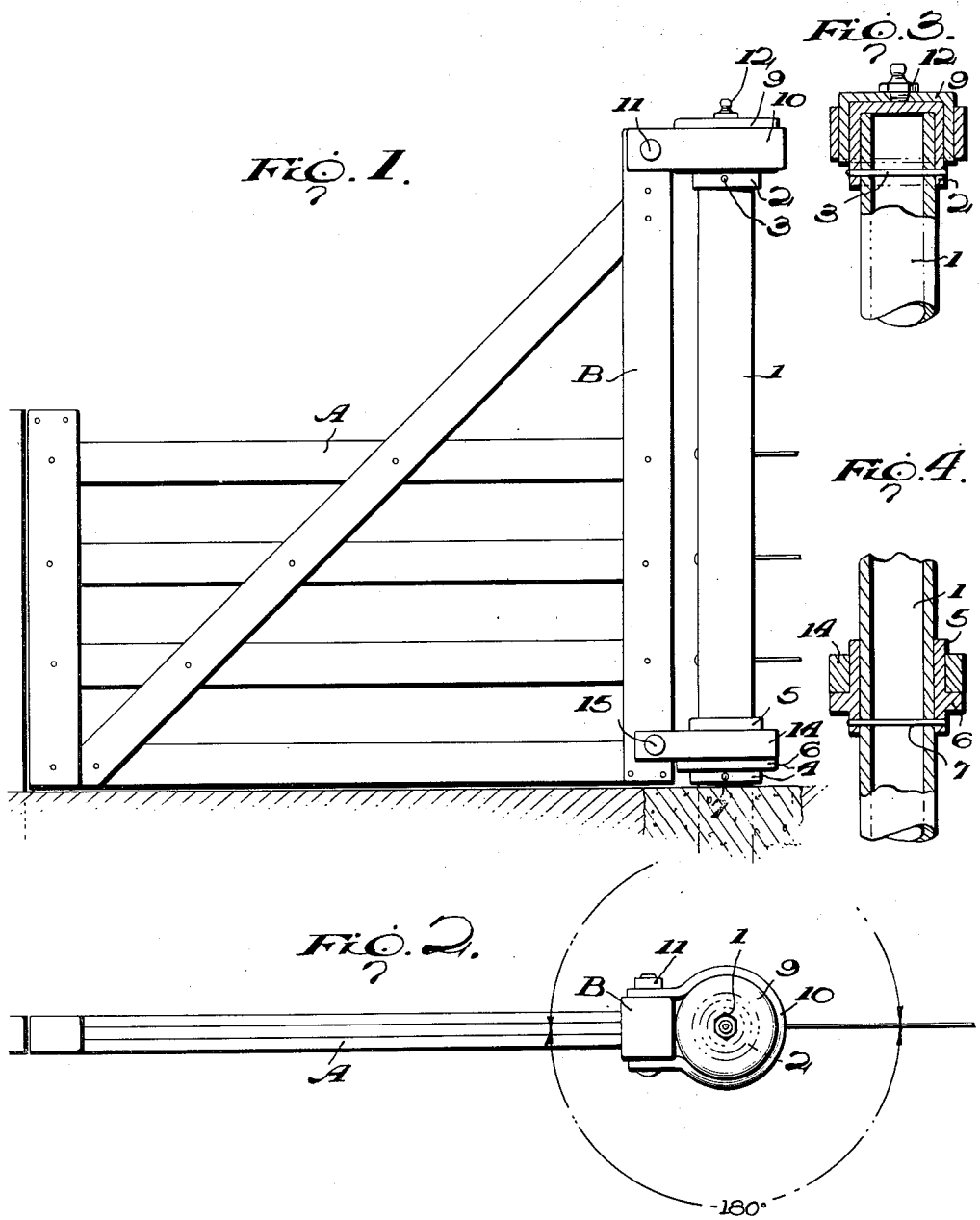
INVENTOR.
Howard W. Steward
BY
Cameron, Kerkam & Sutton
Attorneys.

Patented July 15, 1952

2,602,954

UNITED STATES PATENT OFFICE 2,602,954

GATE HINGE

Howard W. Steward, Townsend, Mont.

Application August 18, 1947, Serial No. 769,089

1 Claim. (Cl. 16—128)

This invention pertains to improved bearing means for rotatably mounting a gate upon a gate post. It provides a gate mounting which will prevent sagging of the gate structure and which eliminates auxiliary bracing for the gate structure. The bearing structure is simple and strong and requires only the minimum of maintenance.

Where the conventional hinge and pin mounting of rotatable gate structures on gate posts is used the gate tends to sag into contact with the surface of the ground in a comparatively short time, necessitating substantial bracing of the gate structure and continual maintenance work on the gate. Furthermore, in conventional gate structures due to the positioning of the gate post per se and the supporting bar for the pivots of the gate a relatively limited traverse of not more than 90° is realized. In the present structure wearing and sag are eliminated and an effective traverse in either direction of up to 180° may be realized.

It is one object of this invention to provide a gate bearing structure which will eliminate sag and which will require a minimum of maintenance and repair.

It is another object of this invention to provide such a structure which will have an effective traverse of 180° either clockwise or counterclockwise.

It is a further object of this invention to provide gate gearings which will support the gate with great rigidity in a true horizontal position.

Other and further objects of the invention will become apparent as this specification proceeds.

Referring to the drawings:

Fig. 1 is a plan view showing the entire gate structure in assembled position;

Fig. 2 is a top plan view of the gate structure showing the wide female bearing in position on the cylindrical bearing affixed to the upper extremity of the gate post;

Fig. 3 is a cross sectional view of the upper bearing for the gate showing the wide female bearing of the gate in position on the cylindrical bearing carried at the top of the gate post;

Fig. 4 is a cross sectional view of the lower bearing for the gate showing the shouldered cylindrical bearing on the gate post and the ring bearing of the gate structure mounted thereover.

In the drawings, 1 indicates the gate post proper which is preferably formed of cast iron pipe or other cylindrical material. Gate post 1 is designed to be set into a cement base of sufficient depth to provide rigidity to the structure. Cylindrical bearing 2 is shown appropriately fitted over and disposed about the upper extremity of gate post 1. Bearing 2 is preferably formed of steel and is preferably on the order of four to five inches in height. It is appropriately fixedly mounted over gate post 1 as by pin 3 which is inserted through holes bored in bearing 2 and post 1. Lower collared bearing 4 is shown disposed about gate post 1 at its lower extremity adjacent the ground and is designed to receive the lower ring bearing of the gate structure. Collared bearing 4 is preferably formed of steel and is preferably on the order of four to five inches in height. It is designed to fit snugly about gate post 1. As shown, it comprises cylindrical body 5 and shoulder 6 formed integrally therewith and is appropriately bored to receive a pin 7 which holds it in rigid position with respect to gate post 1, adjacent the ground.

Female cylindrical bearing 9 is shown mounted at the upper extremity of the main vertical beam B of gate structure A as by means of integral straps 10 and bolt 11. If desired two or more bolts may be utilized to provide additional rigidity. As shown, female bearing 9 is preferably formed as a cylindrical cap and is designed to fit snugly over cylindrical bearing 2 disposed over the top of gate post 1. It is on the order of four to five inches in depth. Female bearing 9 is preferably formed of steel and carries grease cup 12 suitably affixed at its upper extremity to provide lubrication for upper bearing 2. Ring bearing 14 is shown rigidly mounted at the lower extremity of the main vertical beam B of gate structure A by bolt 15. Ring bearing 14 is preferably formed of steel and is on the order of two to three inches in width to assure a firm and braced seating over cylindrical bearing surface 5 of shouldered bearing 4 over which it is designed to fit snugly.

As indicated, cylindrical bearing 2 and female bearing 9 are of considerable depth, on the order of from 4 to 5 inches, and provide extremely rigid support for the weight of the gate, which support is supplemented by the wide bearing surface of ring bearing 14 and shouldered bearing 4. The support provided by this bearing structure is of such rigidity and strength that no auxiliary support for the extended gate structure is necessary.

The manner of assembling the structure is as follows:

Post 1 with cylindrical bearing 2 and shouldered bearing 4 mounted thereon is set in the ground at the desired position in a bed of soft cement and is maintained in vertical position until the cement base hardens. As shown, shouldered bearing 4 is approximately at ground level. With the gate post set firmly in vertical position the gate structure carrying ring bearing 14 and cylindrical female bearing 9 is raised and ring bearing 14 is slid downwardly over cylindrical bearing 2 and on down until it is fitted over shouldered bearing 4. Cylindrical female bearing 9 is fitted snugly over cylindrical bearing 2 and the gate structure is in erected position. Due to this manner of mounting an extremely rigid and sag-proof bearing for the gate is evolved and a traverse of substantially 180° about gate post 1 in either direction is realized.

The entire gate structure may be prefabricated and may be installed in a surprisingly short time. Once installed maintenance thereof is reduced to the absolute minimum.

The invention is susceptible of numerous embodiments without departing from the spirit thereof. For limitation of its scope attention is directed to the appended claim.

What is claimed is:

In an upper hinge or bearing structure for a gate, a cylindrical male bearing adapted to be rigidly secured over the upper extremity of a gate post, a circular and horizontal top bearing surface on said male bearing, a cylindrical female bearing member snugly fitting over said male bearing, a circular inner bearing surface provided at the inner upper extremity of said cylindrical female bearing member closely rotatably engaging the top bearing surface of said male bearing, an integral strap encircling the major portion of the periphery of said female bearing member to reinforce said bearing member and to provide a support for the upper extremity of a gate, the peripheral inner bearing surfaces of said female bearing member closely engaging the peripheral bearing surfaces of said male bearing.

HOWARD W. STEWARD.

REFERENCES CITED

The following references are of record in the file of this patent:

UNITED STATES PATENTS

| Number | Name | Date |
|---|---|---|
| 138,918 | Mullennex | May 13, 1873 |
| 802,307 | McMasters | Oct. 17, 1905 |
| 1,116,867 | Anderson | Nov. 10, 1914 |
| 1,344,820 | Reh | June 29, 1920 |
| 1,479,352 | Witten | June 1, 1924 |
| 1,540,490 | Mertel | June 2, 1925 |